(12) United States Patent
Pham et al.

(10) Patent No.: US 11,403,642 B2
(45) Date of Patent: Aug. 2, 2022

(54) TECHNIQUES TO IMPROVE FRAUD DETECTION AT FINANCIAL TERMINALS

(71) Applicant: Capital One Services, LLC, McLean, VA (US)

(72) Inventors: Vincent Pham, Champaign, IL (US); Austin Grant Walters, Savoy, IL (US); Jeremy Edward Goodsitt, Champaign, IL (US); Fardin Abdi Taghi Abad, Champaign, IL (US); Anh Truong, Champaign, IL (US)

(73) Assignee: Capital One Services, LLC

( * ) Notice: Subject to any disclaimer, the term of this patent is extended or adjusted under 35 U.S.C. 154(b) by 69 days.

(21) Appl. No.: 16/722,201

(22) Filed: Dec. 20, 2019

(65) Prior Publication Data

US 2021/0192523 A1 Jun. 24, 2021

(51) Int. Cl.
  *G06Q 20/40* (2012.01)
  *G06Q 40/02* (2012.01)
  *G06Q 20/10* (2012.01)
  *G07F 19/00* (2006.01)
  *G06Q 30/00* (2012.01)

(52) U.S. Cl.
  CPC ..... *G06Q 20/4016* (2013.01); *G06Q 20/1085* (2013.01); *G06Q 20/4014* (2013.01); *G06Q 30/0185* (2013.01); *G06Q 40/02* (2013.01); *G07F 19/207* (2013.01)

(58) Field of Classification Search
  CPC .......... G06Q 20/4016; G06Q 20/1085; G06Q 40/02; G06Q 20/4014; G06Q 30/0185; G07F 19/207

USPC .................................................... 705/35–45
See application file for complete search history.

(56) References Cited

U.S. PATENT DOCUMENTS

| | | | | |
|---|---|---|---|---|
| 7,379,920 B2* | 5/2008 | Leung | .................... | G06Q 20/20 705/67 |
| 2014/0040051 A1* | 2/2014 | Ovick | .................... | G06Q 20/29 705/16 |
| 2014/0067679 A1* | 3/2014 | O'Reilly | .......... | G06Q 20/40145 705/44 |
| 2016/0012465 A1* | 1/2016 | Sharp | .................... | G06Q 20/18 705/14.17 |

(Continued)

OTHER PUBLICATIONS

IP.com NPL (non-patent literature) Search, dated Mar. 7, 2022. (Year: 2022).*

(Continued)

*Primary Examiner* — Hai Tran
(74) *Attorney, Agent, or Firm* — KDB

(57) ABSTRACT

Techniques to improve fraud detection for financial institutions maintaining a network of financial terminals. These techniques are applicable towards identifying instances of multiple account usage with at least one of the financial terminals. Example financial terminals known as Automated Teller Machines (ATMs) capture image data whenever a visitor initiates a financial service (and/or receives something of value) and leverage the techniques described herein to determine whether the visitor is engaged in multiple account usage. Such multiple account usage may occur when the visitor withdraws cash against two different accounts. These techniques are further applicable towards securing the two different accounts from misappropriation.

20 Claims, 8 Drawing Sheets

(56) References Cited

U.S. PATENT DOCUMENTS

2016/0125404 A1* 5/2016 Roof ................. G06Q 20/18
                                                        705/18
2017/0270496 A1* 9/2017 Glower ............. G06Q 20/4016

OTHER PUBLICATIONS

IP.com Patent Search, dated Mar. 7, 2022. (Year: 2022).*
Dialog NPL (non-patent literature) Search, dated Mar. 8, 2022. (Year: 2022).*

* cited by examiner

US 11,403,642 B2

TECHNIQUES TO IMPROVE FRAUD DETECTION AT FINANCIAL TERMINALS

BACKGROUND

Financial Terminals (e.g., Automated Teller Machines (ATMs)) may dispense cash and other items of value (e.g., tickets, postage stamps) for a geographic area. These financial terminals are physical machines that belong to one or more of various financial institutions and have replaced actual human agents of these financial institutions. For at least these reasons, financial terminals are often targeted by criminals and other malicious actors. It is now nearly impossible to physically carry away these financial terminals to a safe location, as security mechanisms are in place to protect the items in these financial terminals. People wishing to steal cash or other items of value must somehow obtain access through the above-mentioned security mechanisms. Of course, this can be done in a number of ways, such as via fraud.

Today, there is an ongoing battle between malicious actors and the various financial institutions throughout the globe. Malicious actors are constantly evolving their schemes making conventional systems ineffective against at least some fraudulent schemes and eventually obsolete in the foreseeable future.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to provide improved fraud detection at financial terminals. Some embodiments are particularly directed to techniques to detect fraud at a financial terminal by identifying multiple account usage. In one embodiment, for example, an apparatus may comprise logic stored in computer memory and executed on a processing circuit. The logic may be operative to cause the processing circuit to: process a captured image from a financial terminal to determine potential identity data for a user that corresponds to the captured image. The captured image corresponds to a transaction being submitted via the financial terminal against a financial account with an associated financial institution. The logic may be operative to identify, via a recognition unit, multiple account usage by the user based upon a comparison, by the recognition unit, between the captured image and an image associated with another transaction against a different financial account from the financial account. The logic may be operative to communicate a notification message to the associated financial institution of the multiple account usage. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
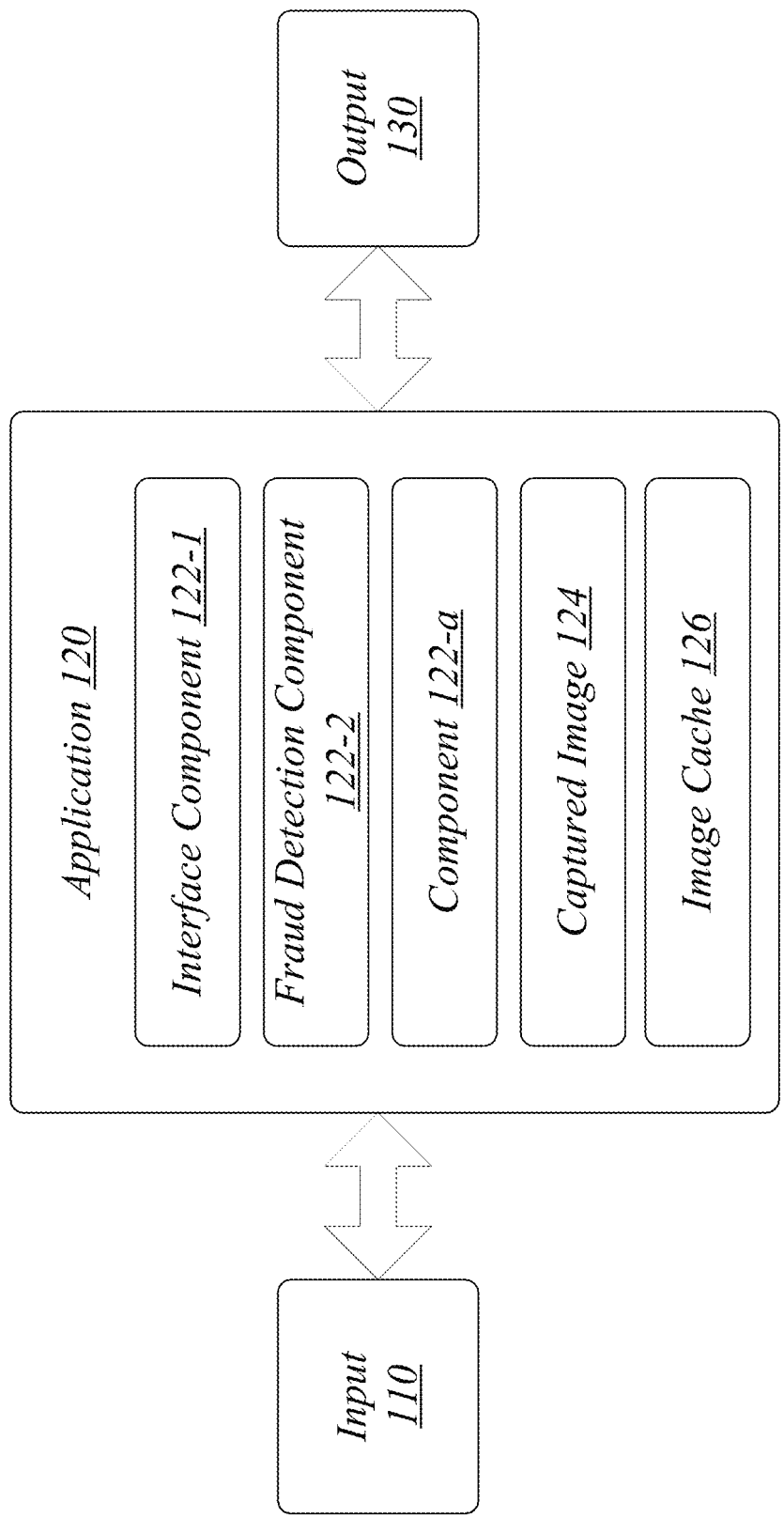
FIG. 1 illustrates an embodiment of a system to improve fraud detection at financial terminals.

Various embodiments are directed to improving fraud detection at financial terminals. Some of the various embodiments are directed to improving fraud detection by identifying instances of multiple account usage by one or more users. While the present disclosure does not describe every situation in which multiple account usage may occur, it is appreciated that multiple account usage encompasses a wide variety of scenarios. To illustrate by way of example, a user engages in multiple account usage by visiting a first financial terminal to complete a first transaction (e.g., a cash withdrawal) and then, visiting a second financial terminal to complete a second transaction (e.g., another cash withdrawal or another financial service) against a different financial account than the one used for completing the first transaction. In another example of multiple account usage, the user may interact with two or more financial accounts when engaging in tasks other than monetary transactions (e.g., a bank account balance inquiry). It is appreciated that other examples of multiple account usage are envisioned by the present disclosure, and no particular type of multiple account usage should be excluded from fraud detection and protection.

Because instances of multiple account usage are indicative of fraudulent activity, embodiments described herein may engage in protective steps of which at least includes notifying an associated financial institution of the multiple account usage. The notifying can be accomplished by communicating a notification message to an email account mailbox for any financial institution involved in the multiple account usage (e.g., a bank operating as one of the financial terminals or issuing one of the financial accounts). By way of such notification, the associated financial institution may be prompted to take some action securing one or both of the affected financial accounts. Therefore, the protective steps are configured to secure a legitimate user's financial account from misappropriation. The associated financial institution may provide functionality (e.g., via an Application Programming Interface (API)) enabling some embodiments to provide instructions directing the associated financial institution to decline a pending transaction.

It is appreciated that the present disclosure does not foreclose on consulting other informational items to determine whether an instance of multiple account usage rises to a level of suspicion warranting the execution of one or more protective steps. Combined with other information associated with the multiple account usage (e.g., a geographic area, a time/time interval, an account type, etc.), the embodiments may leverage machine learning modeling concepts to predict how likely the multiple account usage is fraudulent. As a result, the embodiments can improve security and interoperability for technology in the financial space.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to the desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general purpose computer as selectively activated or reconfigured by a computer program stored in the computer. The processes presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-$a$. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

As mentioned above, the system 100 includes the application 120 as a type of software application running on an electronic device, such as a desktop application running on an operating system of a computing device, a mobile application running on a mobile operating system of a mobile device, or a web application running on a browser component of either the mobile operating system or the desktop operating system. Those skilled in the art would understand how to design, build, and deploy the software application on any type of electronic device.

The application 120 may be generally arranged to process input 110 of which some input may be provided directly to an interface component 122-1 via an input device, and other input may be provided to the interface component 122-1 via a network. For example, a user may enter data via a keyboard device attached to a computing device running the application 120. The application 120 may be generally arranged to generate output 130 for the interface component 122-1 of which some output may be configured for display on a display device, and other output may be communicated across the network to other devices. As an example, the application 120 may generate data that can be processed/rendered by the interface component 122-1 into content for a Graphical User Interface (GUI). In many embodiments, input 110 may correspond to a transaction against a financial account.

The application 120 may be generally arranged to provide a practical improvement by way of a fraud detection component 122-2 operating on captured images including a captured image 124. The captured images, including the captured image 124, may correspond to a transaction against a financial account. Data about the transaction may be received as part of input 110. One practical improvement includes an identification, by the fraud detection component 122-2, of possible fraudulent activity at a financial terminal and/or a possible opportunity to at least mitigate any damage caused by such activity. In some embodiments, multiple account usage may constitute the possible fraudulent activity. Generally, for the captured image 124, the fraud detection component 122-2 determines whether that captured image matches an image from a previous transaction against a different financial account or matches an image from a future transaction against the different financial account, for example, a transaction received via separate input 110.

In general, the captured image 124 includes captured image data taken by the financial terminal. However, in some embodiments, the captured image 124 may be taken by a separate device, such as a mobile phone. In some embodiments, the system may send a request to a separate device requesting a captured image 124. The captured image 124 may be sent from the separate device and received by the financial terminal, for example, as part of a verification of the transaction and/or the identity of the user involved in the transaction. It will be recognized that such distributed embodiments may take advantage of network-enabled communications, for example, using servers and system components as described in greater detail herein.

The captured image 124 may include a representation of a user associated with the financial transaction. For example, the captured image 124 may comprise an image of the user taken by a camera coupled to the financial terminal and/or a separate device. It will be recognized that alternative or additional identifying data may be included in the captured image 124. For example, the captured image 124 may comprise biometric data such as an estimation of a user's height, an image captured from the screen of the financial terminal and/or mobile device containing received information uniquely known to the user, and/or other identifying data. Information may be received via an interface component 122-a and/or otherwise determined by the application 120.

The fraud detection component 122-2 may perform a comparison between the captured image data and image data that may depict a financial service user. For example, the comparison may determine whether a user depicted in the captured image 124 matches the financial service user depicted in the image data. The fraud detection component 122-2 may compare images directly, such as via a feature-to-feature comparison, or indirectly. For example, a fraud detection component 122-2 may compare the captured image data and/or image data to data known to depict a user, such as a verified image of a user.

In some embodiments, the fraud detection component 122-2 utilizes an image cache 126 to access the image data for comparison with the captured image data. The image cache 126 may include images taken by a plurality of financial terminals that are in operation over a geographic area. Each cached image in the image cache 126 may represent a portion of a total number of captured images in a geographic area. The fraud detection component 122-2 may operate simultaneously with a particular financial terminal processing the captured image 124 for a pending transaction. In some embodiments, only a portion of the total number of captured images are used for the comparison with the captured image 124 for the pending transaction. The fraud detection component 122-2 may select, for the comparison with the captured image 124, images for the image cache according to various criteria, such as a radius (e.g., in miles) from a center of the geographic area, a time interval (e.g., in days), and/or physical characteristics.

In some embodiments, the fraud detection component 122-2 improves upon conventional fraud detection by introducing a new capability, namely identification of multiple account usage. The fraud detection component 122-2 may leverage identity data gained from captured images in the geographic area and/or other additional data sources to identify any user engaging in the multiple account usage. By identifying, in various ones of the captured image 124, a same person applying for and then receiving a financial service (e.g., cash or other items of value) from different financial accounts, the fraud detection component 122-2 may determine that the person is likely engaging in multiple account usage. As another example, if two or more captured images 124 depict different persons applying for and receiving a financial service from the same financial account, the fraud detection component 122-2 may determine that the account is subject to multiple account usage.

In some embodiments, the fraud detection component 122-2 commences one or more protective steps in response to multiple account usage such as the above-mentioned example of multiple account usage. As described herein, the fraud detection component 122-2 may generate a notification, an email message or another type of message directed towards an affected party of the multiple account usage. It is appreciated that those parties affected by the same person engaging in multiple account usage include a financial institution (e.g., a bank) owning/operating one or both of the financial terminals, a financial institution issuing one or both of the financial accounts, a government agency in charge of oversight, and/or the like. Each of these affected parties provides at least an address to which notifications of multiple account usage are communicated (e.g., an email address). In some embodiments, a financial institution implements an API to which notifications and/or other control directives are communicated. Some control directives are commands operative to invoke some functionality on the API, such as a function instructing the financial institution to decline a pending transaction.

The present disclosure includes embodiments that consider other factors before labeling an instance of multiple account usage as fraudulent. Some example embodiments of the fraud detection component 122-2 prescribe a technique (e.g., a machine learning technique) to analyze data (e.g., feature data) corresponding to the instance of multiple account usage and determine a likelihood of fraudulent activity. An example technique includes a mathematical function (i.e., in a deep learning model, such as an artificial neural network) or a probability distribution (i.e., in a statistical model, such as Bayes classifier) for accepting, as input, the feature data corresponding to the instance of multiple account usage and producing, as output, a value (e.g., a probability) corresponding to a likelihood of fraudulent activity. The fraud detection component 122-2 may rely upon this value to determine the protective steps to execute. To illustrate, a value exceeding a first threshold value may prompt the fraud detection component 122-2 to communicate a notification message to an associated financial institution while a value exceeding a second threshold value may prompt the fraud detection component 122-2 to instruct an associated financial institution to decline a pending transaction by the user behind the multiple account usage. It is appreciated that the pending transaction may be a last (e.g., second) transaction of the multiple account usage or a transaction occurring after identification of the multiple account usage.

Figure 2:
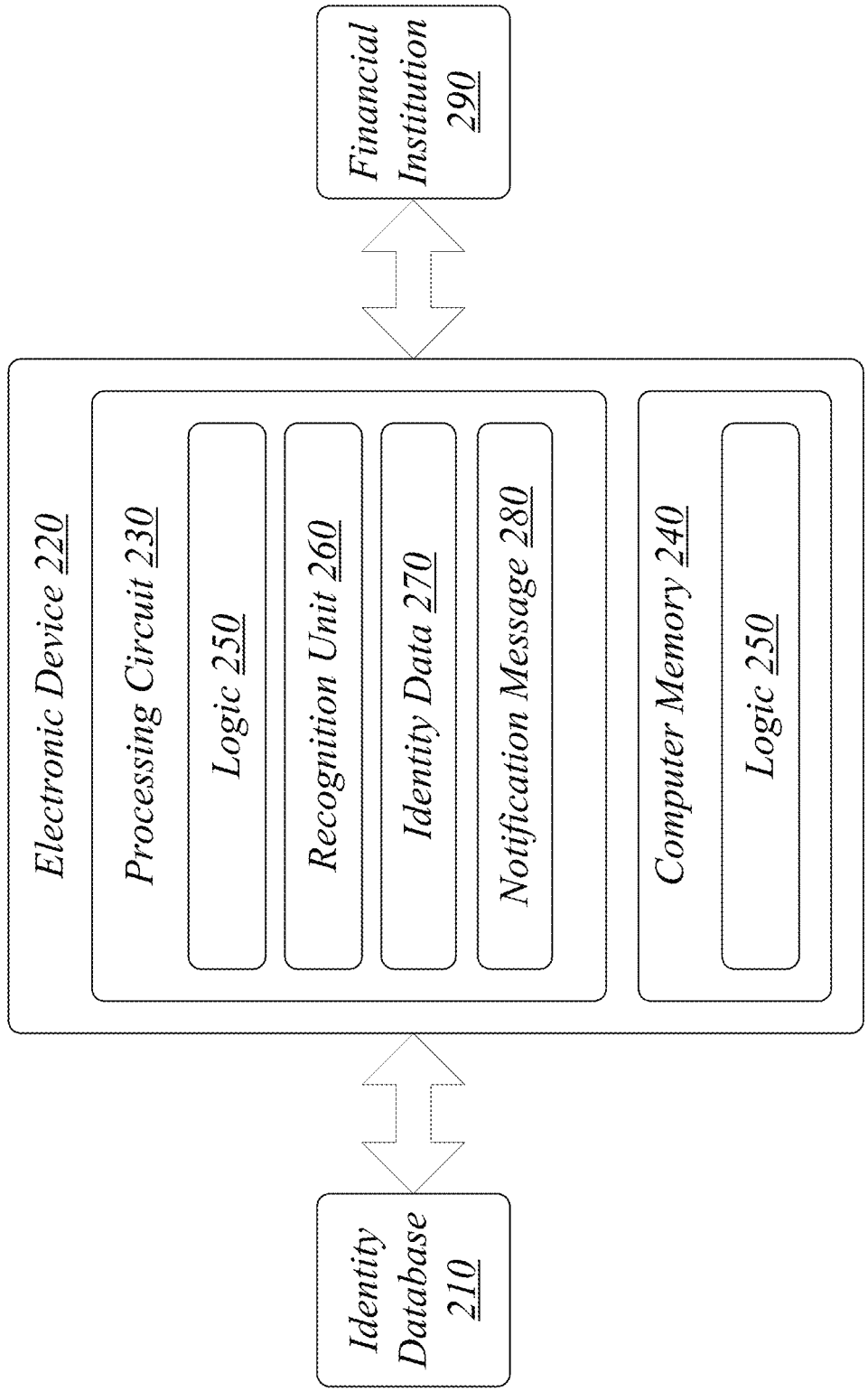
FIG. 2 illustrates an embodiment of an apparatus for the system of FIG. 1.

FIG. 2 illustrates an embodiment of an apparatus 200 for the system 100. As shown in FIG. 2, the apparatus 200 includes an electronic device 220 having computer memory 230 and a processing circuit 240. It is appreciated that the apparatus 200 may be couple the electronic device 220 to a financial terminal via a physical connection or a network connection. As an alternative, the apparatus 200 may configure the electronic device 220 to operate as a financial terminal.

The apparatus 200 provides the electronic device 220 with access to an identity database 210 storing database records for a number of individuals. The present disclosure describes the identity database 210 as inclusive of any information capable of identifying a person amongst a group of people, such as a full name, a social security number, a driver's license number (or any other unique identifier), image data, biometric data, and/or the like. A portion of these individuals previously operated a financial terminal to dispense cash or another item of value and had their likeness memorialized in their identifying image data. As described herein, for the purposes of fraud detection, the image data of a person from the identity database 210 may include an example image for comparison with images captured by financial terminals within the geographic area.

Execution of the logic 250, when stored in the computer memory 230, is operative to cause the processing circuit 240 to perform the above-mentioned comparison when a captured image is being processed for a recent transaction with a financial terminal. In some embodiments, the logic 250 selects a portion of the images in the identity database 210 to compare with the captured image. Instead of all or most of the images stored in the identity database 210, it is more effective to perform the above-mentioned comparison on some of the images in the identity database 210. The logic 250 may select images from financial terminals based on distance, for example, by selecting images from financial terminals that are located within a same geographic area as the financial terminal or at least within a configurable number of miles from that financial terminal. The logic 250 may select images from financial terminals having another factor, such a same financial institution.

The logic 250 is configured to cause the processing circuit 240 to process, via a recognition unit 260, a captured image from a device operating as a financial terminal to determine potential identity data 270 for a device user that corresponds to the captured image. It is appreciated that the recognition unit 260 refers to any physical component capable of performing image recognition on image data. Such image recognition may be accomplished by instructing the recognition unit 260 to compare the captured image to at least a portion of the images in the identity database 210 and determine whether that captured image corresponds to any individual in the identity database 210. In some embodiments, when the captured image is communicated from the device to the electronic device 220 over a network, the logic 250 instructs the recognition unit 260 to determine whether the identity database 210 includes an image having a statistically significant number of similarities (i.e., similar image features) with the captured image. If the recognition unit 260 identifies such an image, the logic 250 labels any identity data associated with that image as the potential identity data 270.

In the above-mentioned embodiments, the device user that corresponds to the captured image is submitting a transaction via the device 220 against a financial account with an associated financial institution, such as a financial institution 290. It is appreciated that the financial institution 290 provides various services (e.g., transaction services, fraud detection services, and/or the like) via APIs and the logic 250 may be configured with an interface to communicate control directives invoking at least some functionality of at least one of these services.

The logic 250 is configured to cause the processing circuit 240 to identify multiple account usage by the device user based upon a comparison, by the recognition unit 260, between the captured image and an image associated with another transaction against a different financial account from the above-mentioned financial account. In some instances, image data associated with the potential identity data 270 includes an example image associated with another transaction against a different financial account from the above-mentioned financial account. The different financial account may be administered by the financial institution 290 or another financial institution. As an alternative, the logic 250 may pull images from other sources for the comparison, by the recognition unit 260, between the captured image and an image associated with another transaction against a different financial account from the above-mentioned financial account. The system 100 may configure the logic 250 with settings defining a search procedure for the pulled images. In some embodiments, the logic 250 is configured to submit control directives to invoke functionality for requesting/receiving image data associated with various transactions. In response to these control directives, the financial institution 290 returns image data associated with sets of transactions that differ in scope.

The logic 250 is configured to cause the processing circuit 240 to communicate to the financial institution 290 a notification message 280 having information describing the multiple account usage by the device user. The notification message 280 may be a notification or an email message that is directed to a network address for the financial institution 290.

The notification message 280 may indicate the different financial accounts associated with the multiple account usage. The notification message 280 may additionally, or alternatively, include location data for at least one financial terminal associated with a transaction of the multiple account usage. In some embodiments, the notification message 280 may include one or more additional flags indicating a relevancy, severity, and/or urgency of the multiple account usage. For example, a flag may indicate that the user of multiple account usage is a user previously suspected of multiple account usage, or that a financial account of the multiple account usage has been previously involved in multiple account usage. In another embodiment, the notification message 280 may include a number of accounts estimated to be involved in the multiple account usage.

The notification message 280 may further include control directives for the financial institution 290. In some embodiments, the financial institution 290 provides an API running as a web service and configured to accept control directives invoking various functionality. As described herein, an example control directive may instruct the financial institution 290 to decline a pending transaction by the same user behind the multiple account usage. In further examples, a control directive may instruct the financial institution 290 to flag a pending transaction, transactions associated with a user account, and/or transactions associated with a user for further review.

Figure 3A:
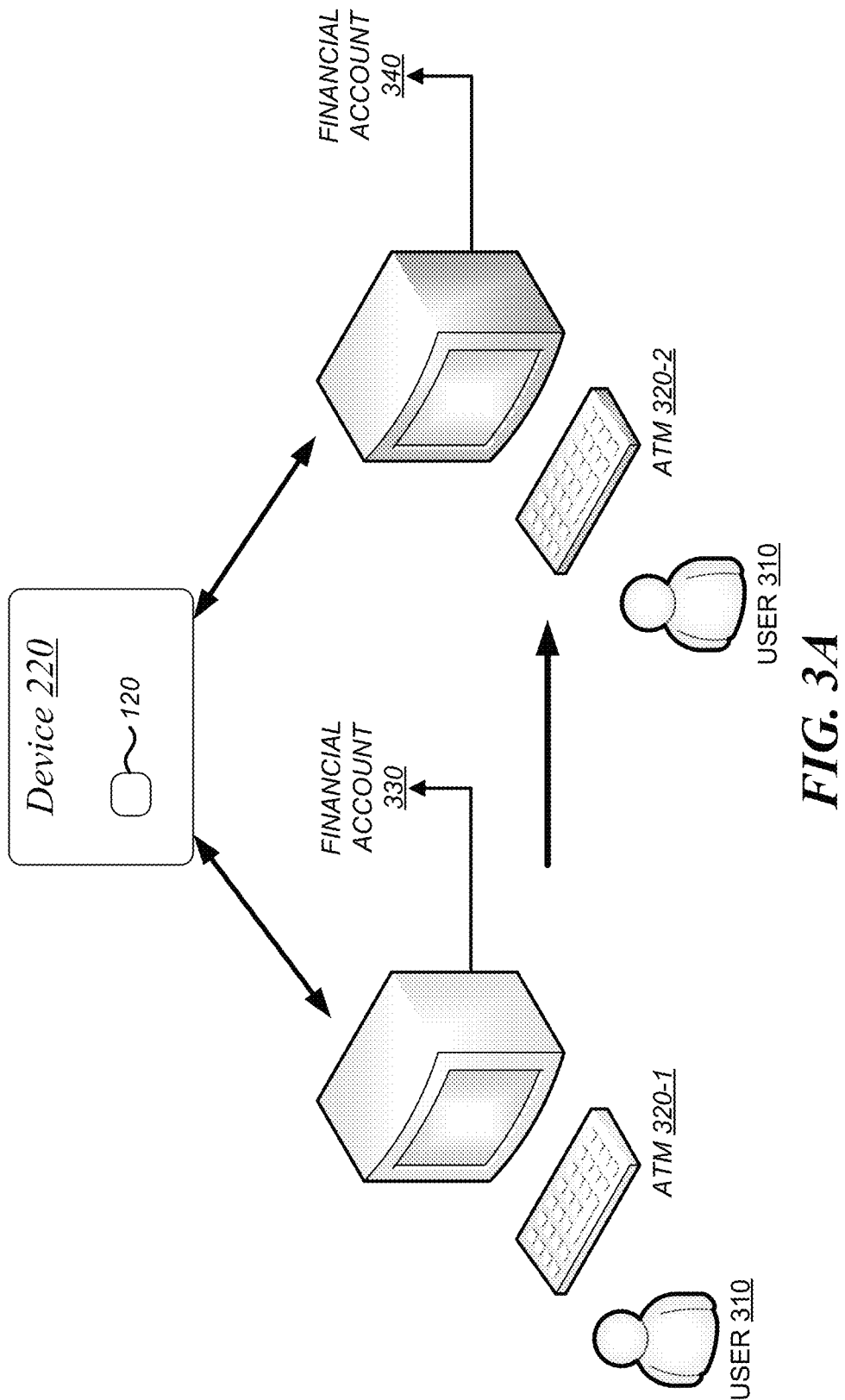
FIG. 3A and FIG. 3B illustrate at least two embodiments of an operating environment for the system of FIG. 1.

FIG. 3A illustrates an embodiment of an operational environment 300 for the system 100. As shown in FIG. 3A, the operating environment 300 includes multiple financial terminals of which some function as automated teller machines or ATMs. Although not illustrated in FIG. 3A, it is appreciated that the operating environment 300 configures the multiple financial terminals into a network where data is shared amongst the financial terminals.

As illustrated in FIG. 3A, a user 310 visits a location of an ATM 320-1 to negotiate a (first) financial transaction against a financial account 330. Then, the user 310 visits a location of an ATM 320-2 to navigate that ATM for a (second) financial transaction against a financial account 340. Hence, FIG. 3A depicts multiple account usage by way of the above first and second transactions from the same user—the user 310—against different financial accounts— the financial account 330 and the financial account 340— and the system 100 identifies such behavior as indicia for fraud. As described herein, the system 100 may engage in a number of techniques to mitigate this potential fraud, such as by notifying an associated financial institution to at least one of the financial account 330 or the financial account 340. The system 100 may go further than sending a notification of the multiple account usage, for example, by invoking functionality to flag the financial account 330 or the financial account 340 for further review (for fraud).

Figure 3B:
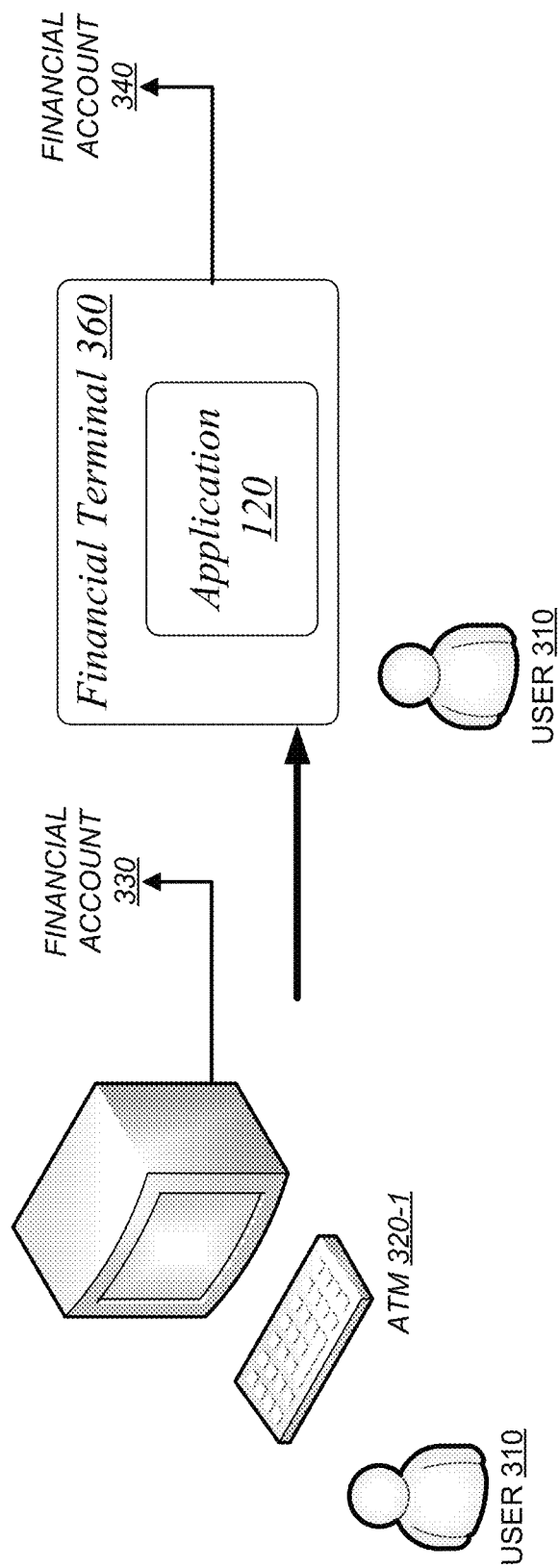

FIG. 3B illustrates an operating environment 350 for the system 100. The operating environment 350, by having the application 120 resides within a financial terminal 360, may be considered an alternative to the operating environment 300 where the application 120 operates within a separate device from any financial terminal. The financial terminal 360 may be an ATM or another type of device capable of administering financial services.

In some embodiments, the application 120 operates in a similar manner, regardless of whether the operating environment 300 or the operating environment 350 is present. The user 310 is seeking financial services from the ATM 320-1 and the financial terminal 360 against the financial account 330 and the financial account 340, respectively. When the user 310 approaches the financial terminal 360 and applies for financial services, the financial terminal 360 captures image data (e.g., one or more images) corresponding to at least a facial likeliness of the user 310. It can be assumed that the financial terminal 360 has equipment (e.g., a camera and/or other device with an image sensor) capable of capturing image data for such equipment is available to those of any skill. The financial terminal 360 provides, as input, the captured image data to the application 120. The application 120 may respond with information indicating whether or not the user 310 may be engaged in fraudulent activity (e.g., due to multiple account usage). It is appreciated that the application 120 may operate differently when in the operating environment 350 while providing equivalent fraud detection.

As described herein, the application 120 may have access to a plurality of captured images that were recorded by a network of financial terminals. By comparing the captured image data and at least some of the plurality of captured images, the application 120 may identify at least one matching image where the user 310 applied for a financial service (e.g., cash withdrawal or a similar transaction) against a different financial account from the account used at the financial terminal 360. A financial institution may provide the application 120 with access, via an API, to their capture image data (cache). The present disclosure describes various techniques for selecting images for the comparison, such as by selecting images from within a certain proximity or distance from the financial terminal 360, within a time interval from the current transaction with the financial terminal 360, having a same Bank or Financial Service Provider, and/or by another attribute. As an example, the different financial account mentioned above could be a financial terminal located within a two (2) mile radius of the financial terminal 360 and/or affiliated with a competing financial institution.

Figure 4:
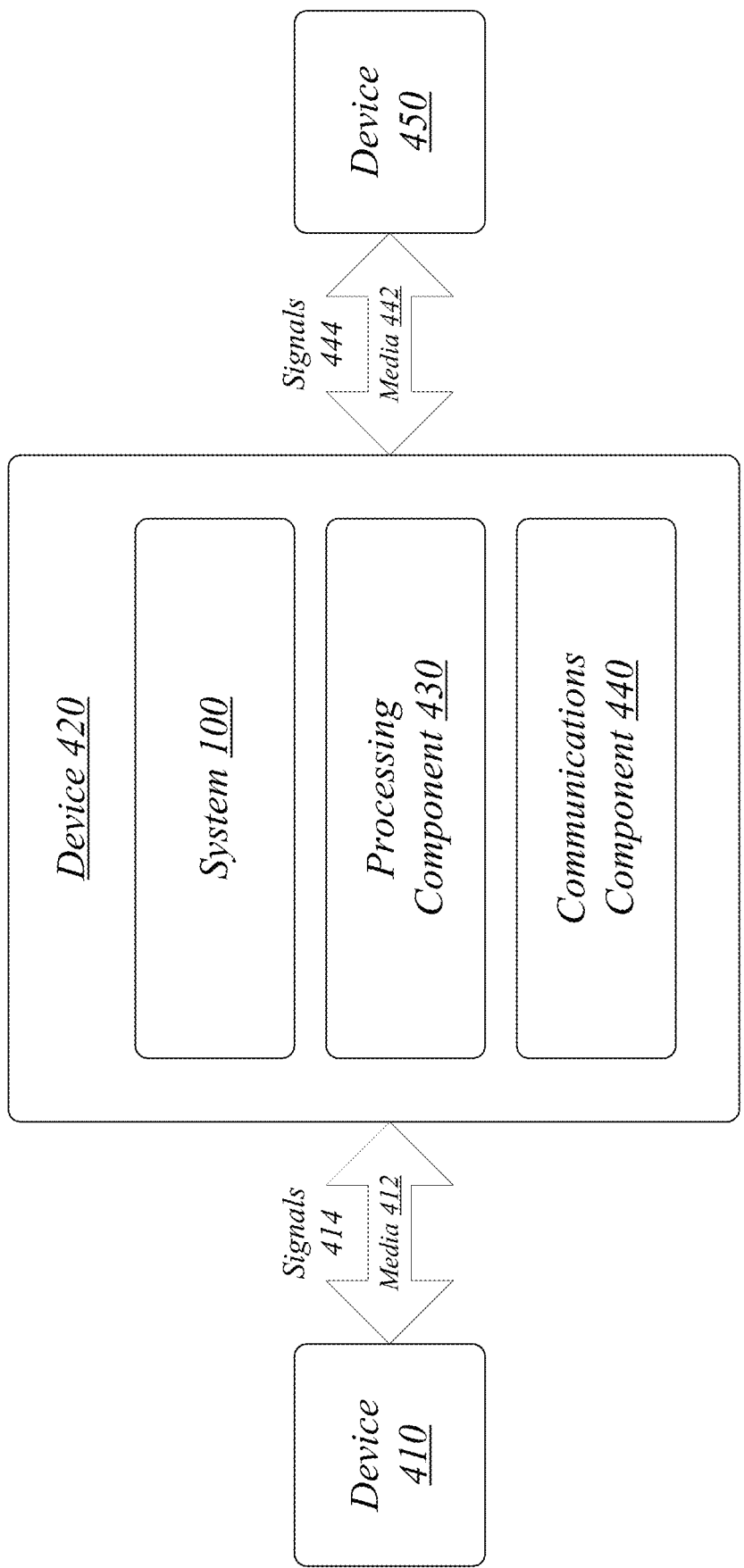
FIG. 4 illustrates an embodiment of a centralized system for the system of FIG. 1.

FIG. 4 illustrates a block diagram of a centralized system 400. The centralized system 400 may implement some or all of the structure and/or operations for the system 100 in a single computing entity, such as entirely within a single device 420.

The device 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 420 may execute processing operations or logic for the system 100 using a processing component 430. The processing component 430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chipsets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412, 442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 420 may communicate with other devices 410, 450 over a communications media 412, 442, respectively, using communications signals 414, 444, respectively, via the communications component 440. The devices 410, 450 may be internal or external to the device 420 as desired for a given implementation.

As an alternative, the system 100 may be implemented as a distributed system. The distributed system may distribute portions of the structure and/or operations for the system 100 across multiple computing entities. Examples of distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context. The distributed system may comprise the devices 410, 450 as clients and the device 420 as a server.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
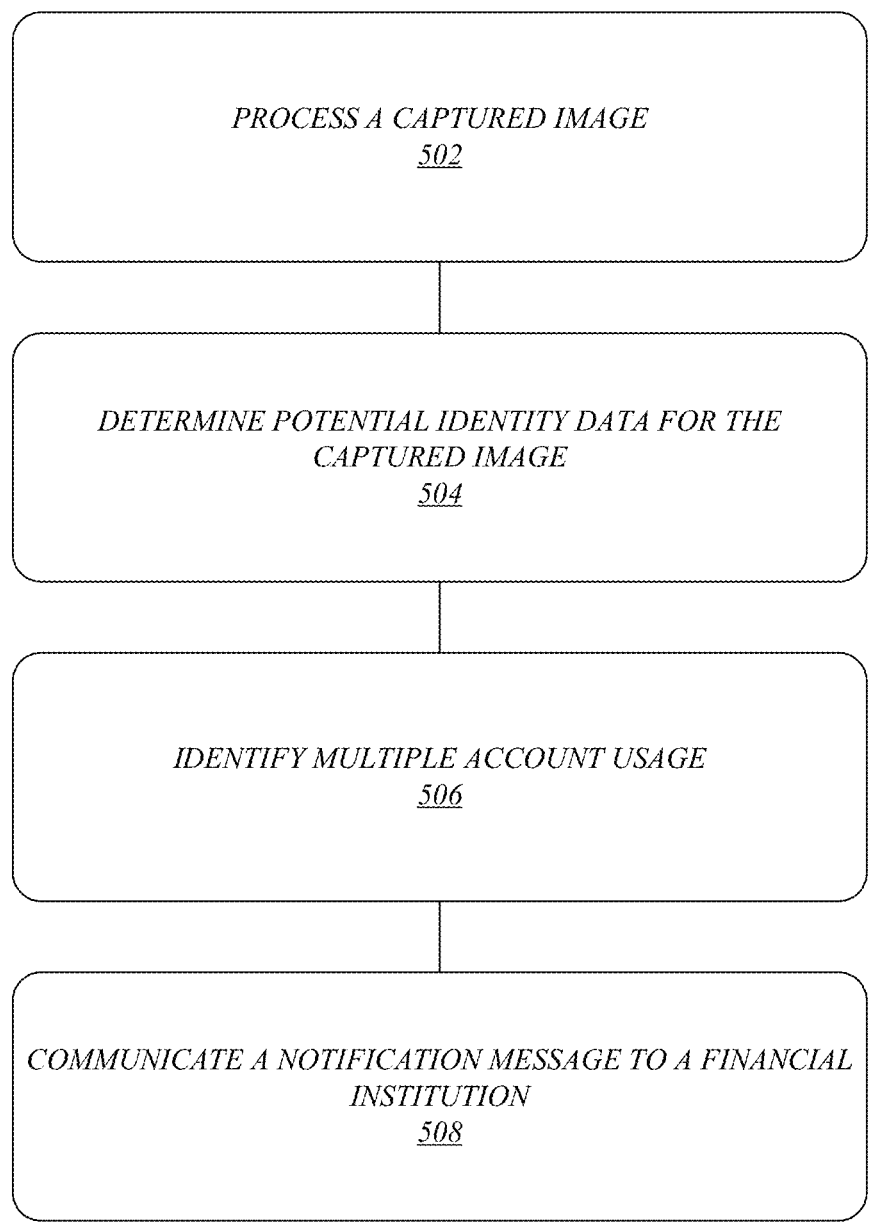
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes a captured image at block 502. In some embodiments, the system 100 executes the logic flow 500 using an electronic device such as the electronic device 220 of FIG. 2. The electronic device may be coupled, via physical connection or a network connection, to at least one financial terminal, such as an ATM, and further capable of establishing a network connection within other financial terminals for fraud protection. As described herein, images of users visiting financial terminals may be captured and transmitted via the physical connection or the network connection to the above-mentioned electronic device. Hence, when any given financial services user visits a financial terminal connected to the above-mentioned electronic device, various equipment (e.g., a digital camera) records the user's transaction in the form of at least the captured image. Subsequently, the logic flow 500 may receive the captured image from the recording financial terminal and proceed in processing the captured image, for example, for image features and/or security risks.

The logic flow 500 may determine potential identity data for the captured image at block 504. For example, the logic flow 500 may determine a name, an account number, a phone number, and/or any other attributes identifying the user in the captured image. In some embodiments, the logic flow 500 may determine such information by consulting a database storing records with user identity data that includes one or more images and attribute data identifying each user in the database. The logic flow 500 may identify a matching image (e.g., a cached image) in the database and use that matching image's corresponding attribute data as at least a portion of the potential identify data. The logic flow 500 may engage a hardware/software mechanism referred to herein as a recognition unit to perform a comparison between the captured image and an image in the above-mentioned database of identity data. The recognition unit may perform the comparison by comparing image features for similarity. It is appreciated that there are a number of available techniques (e.g., facial recognition techniques) that can be employed by the recognition unit to determine the potential identity data.

The logic flow 500 may identify multiple account usage at block 506. It is appreciated that multiple account usage may occur in a number of circumstances, such as when the user successfully accesses two or more different financial accounts with different sets of valid credentials and completes two or more transactions against the two or more different financial accounts. Multiple account usage does not require that the user request a financial service and successfully receive some benefit; mere access is sufficient to qualify as multiple account usage. The present disclosure enhances fraud detection by describing embodiments directed towards identifying multiple account usage for such behavior is suspicious activity and indicative of fraud. Multiple account usage, to illustrate by way of example, includes the misappropriation of a legitimate client's financial account and/or funds.

There are a number of techniques employable by the logic flow 500 for determining whether the user's financial terminal visits and associated transactions qualify as multiple account usage. As described herein, the logic flow 500 may identify one or more images matching the captured image for the purpose of determining the potential identity data for the user in the captured image. One of the above-mentioned database images matching the captured image may correspond to either an earlier transaction or a later financial terminal transaction by the same user in the captured image. Such a transaction may have taken place at a date, time, and/or place satisfying certain parameters, such as a time interval (e.g., in a same week as the financial terminal associated with the captured image), a location (e.g., a geographic area), a proximity (e.g., within a configurable number of miles from the financial terminal associated with the captured image), and/or the like. In accordance with the present disclosure, the same user may visit the same financial terminal or a different financial terminal while using differential financial credentials for the multiple account usage. One example technique determines whether the same user has withdrawn or transferred cash from at least two different financial accounts. For example, a first image captured at a first ATM may depict a person conducting a transaction against a first account. A second image captured at a second ATM (different than the first ATM) may depict the person conducting a transaction against a second account. A comparison of the first and second images may determine that the same person is depicted in the first and second images. Therefore, the logic flow may determine that the person depicted in the first and second images is engaged in fraudulent activity.

The logic flow 500 may communicate a notification message to a financial institution at block 508. It is appreciated that there are a variety of ways for the logic flow 500 to communicate the notification message, for example, as an email message communicated to a particular email address or as a function call on an API maintained by the financial institution. In some embodiments, the logic flow 500 communicates an example notification message having one or more control directives for the financial institution. In some embodiments, the logic flow 500, by way of the notification message, causes future pending transactions to be declined regardless of which financial terminal is being used or which financial institution is involved. In some embodiments, the logic flow 500 may cause future pending transactions to be approved only after confirmation of a human review by the financial institution. An example control directive may instruct the financial institution to decline a transaction, such as one of the associated transactions mentioned above or a future transaction. For a declination to be effective, in most cases the transaction has to be a pending transactions. The financial institution may label the user as a malicious actor and link the user's identity with information on the multiple account usage, preventing other financial terminals from servicing the user. The financial institution may (preemptively) instruct a financial terminal to decline any future transaction from the user. There are a number of organizations (e.g., government agencies) implementing programs that track fraudulent behavior for law enforcement purposes. The financial institution may use one of these programs to at least warn other financial institutions. The embodiments are not limited to this example.

Figure 6:
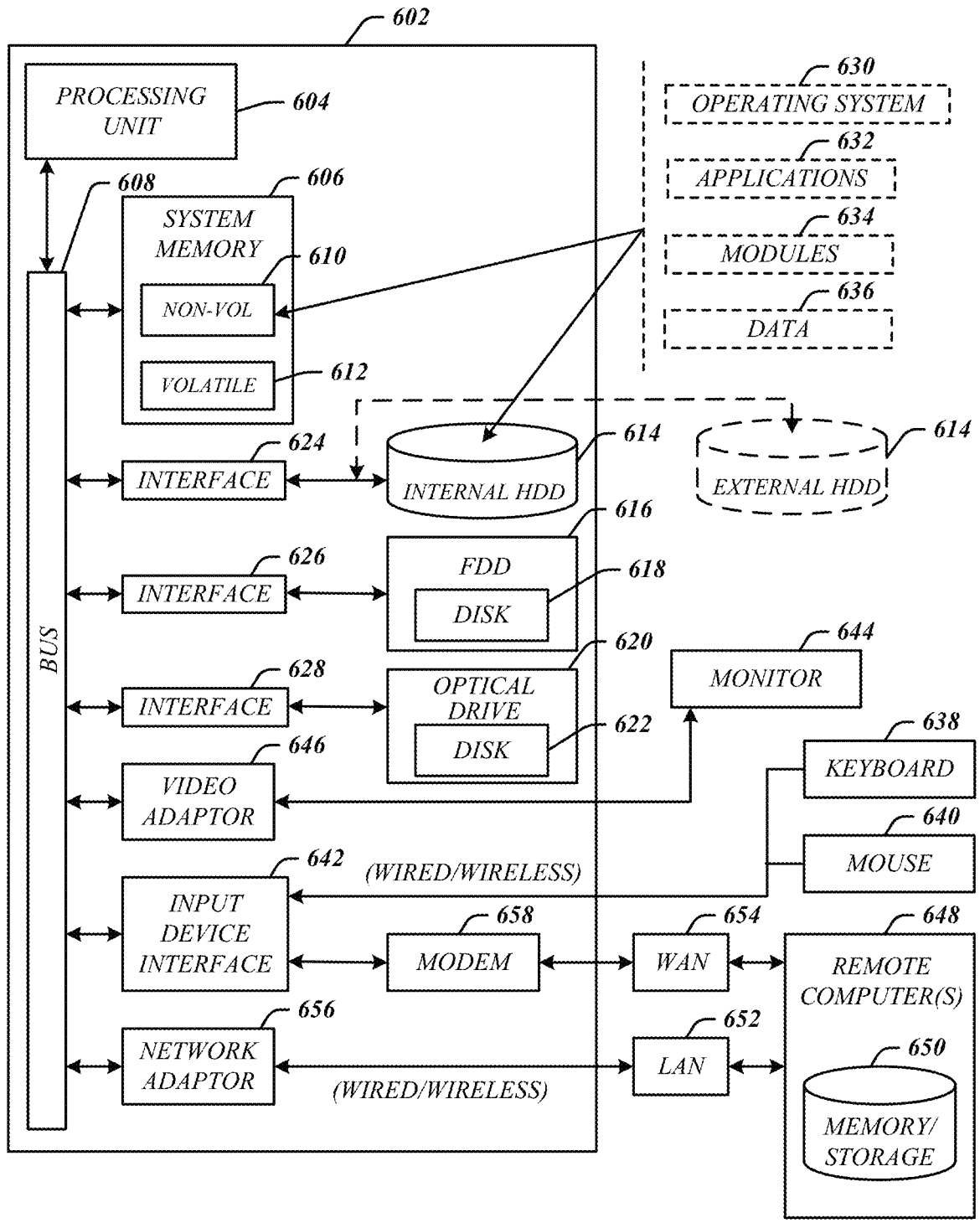
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
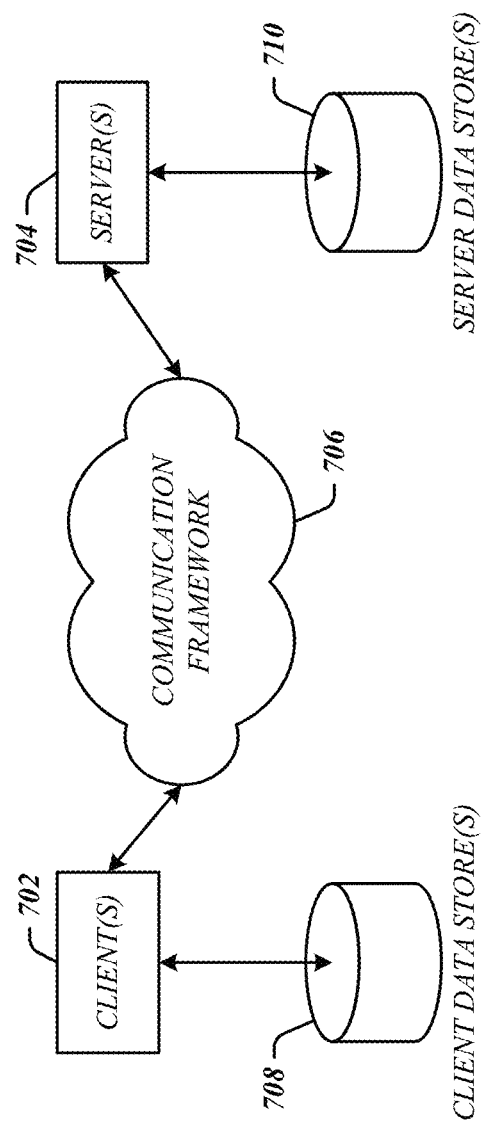
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and/or the servers 704 may implement the aspects of device 220 and/or device 420, for example. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processing circuit; and
logic stored in computer memory and executed on the processing circuit, the logic operative to cause the processing circuit to:
process, via a recognition unit, a first image captured by a device to determine identity data to identify a user that corresponds to the first image, the first image corresponding to a first transaction being submitted via the device against a first financial account with an associated financial institution;
identify, by the recognition unit, multiple different account usage by the user based upon a comparison between the first image and a second image identifying the same user identified in the first image, the second image corresponding to a second transaction submitted against a second financial account, and wherein the second financial account is different than the first financial account, and identifying multiple different account usage by the processing circuit includes causing the processing circuit to:
accept feature data related to multiple different account usage as an input into a statistical classifier executed by the processing circuit;
produce a probability value corresponding to a likelihood of fraudulent activity;
in response to a first threshold value being exceeded by the probability, identify multiple different account usage; and
in response to the identification of multiple different account usage, communicate a notification message to the associated financial institution of the multiple account usage.

2. The apparatus of claim 1, comprising logic operative to further cause the processing circuit to:
determine that the probability value exceeds a second threshold value; and
in response to the second threshold value being exceeded, instruct the associated financial institution to decline the first transaction or the second transaction.

3. The apparatus of claim 1, comprising logic operative to further cause the processing circuit to:
determine that the probability value exceeds a second threshold value; and
in response to the second threshold value being exceeded, instruct a device of the user to decline a pending transaction.

4. The apparatus of claim 1, comprising logic operative to further cause the processing circuit to determine whether the first image matches a cached image from a previous transaction against the second financial account or a captured image from a future transaction against the different financial account.

5. The apparatus of claim 1, comprising logic operative to further cause the processing circuit to store, in a cache, captured images from a plurality of financial terminals in a geographic area.

6. The apparatus of claim 5, comprising logic operative to further cause the processing circuit to select one or more images for the cache according to one or more criteria.

7. The apparatus of claim 5, comprising logic operative to further cause the processing circuit to select one or more images for the cache according to a time interval or a radius from a center of a geographic area.

8. The apparatus of claim 1, comprising logic operative to further cause the processing circuit to instruct another device to decline the second transaction or a pending transaction.

9. A computer-implemented method executed on at least one processing circuit, the computer-implemented method comprising:
  processing, via a recognition unit, a first image from a financial terminal to determine identity data to identify a user that corresponds to the first image, the first image corresponding to a first transaction being submitted via the financial terminal against a first financial account with an associated financial institution;
  identifying, by the recognition unit, multiple different account usage by the user based upon a comparison between the first image and a second image identifying the same user identified in the first image, the second image corresponding to a second transaction submitted against a second financial account, wherein the first account and the second account are different accounts, wherein identifying multiple different account usage further includes:
    accepting feature data related to multiple different account usage as an input into a statistical classifier executed by the processing circuit;
    producing a probability value corresponding to a likelihood of fraudulent activity;
    in response to a first threshold value being exceeded by the probability, identifying multiple different account usage; and
  communicating, in response to the identification of multiple different account usage, a notification message to the associated financial institution of the multiple account usage.

10. The computer-implemented method of claim 9, comprising instructing the associated financial institution to decline a pending transaction.

11. The computer-implemented method of claim 9, comprising instructing the financial terminal to decline the first transaction.

12. The computer-implemented method of claim 9, comprising instructing another financial terminal to decline a pending transaction against the first financial account or the second financial account.

13. The computer-implemented method of claim 9, comprising storing, in a cache, captured images from a plurality of financial terminals in a geographic area.

14. The computer-implemented method of claim 9, comprising selecting the second image for the comparison according to a time interval or a radius from a center of a geographic area.

15. At least one computer-readable storage medium comprising instructions that, when executed by a processor cause the processor to:
  process a first image from an Automated Teller Machine (ATM), the first image corresponding to a first transaction being submitted against a first financial account with an associated financial institution;
  store, in a cache, the first image in accordance with one or more criteria;
  identify multiple different account usage based upon a comparison between the first image and a second image corresponding to a second transaction submitted against with a second financial account, wherein the first image and the second image identify a same single user identified in the first image, and the first financial account and the second financial account are different accounts wherein identifying multiple different account usage by the processor includes causing the processor to:
    accept feature data related to multiple different account usage as an input into a statistical classifier executed by the processor;
    produce a probability value corresponding to a likelihood of fraudulent activity;
    in response to a first threshold value being exceeded by the probability, identify multiple different account usage; and
  in response to the identification of multiple different account usage, communicate a notification message to the associated financial institution of the multiple account usage.

16. The computer-readable storage medium of claim 15, comprising instructions that when executed cause the processor to identify the single user by comparing first identify data associated with the first transaction from the ATM with second identify data associated with the second transaction.

17. The computer-readable storage medium of claim 15, comprising instructions that when executed cause the processor to instruct the ATM or a second ATM to decline the second transaction.

18. The computer-readable storage medium of claim 15, comprising instructions that when executed cause the processor to determine that the first image matches the second image from the second transaction against the second financial account.

19. The computer-readable storage medium of claim 15, comprising instructions that when executed cause the processor to: store, in the cache, other captured images from a plurality of financial terminals in a geographic area.

20. The computer-readable storage medium of claim 19, comprising instructions that when executed cause the processor to select one or more images for the cache according to a time interval or a radius from a center of the geographic area.

* * * * *